United States Patent [19]
Friedrichs

[11] Patent Number: 5,857,655
[45] Date of Patent: Jan. 12, 1999

[54] THERMOMETER MOUNT

[75] Inventor: Arvid Friedrichs, Kreuzwertheim, Germany

[73] Assignee: Friedrichs Gruppe Produktions-u.Vertriebs GmbH, Wertheim, Germany

[21] Appl. No.: 782,309

[22] Filed: Jan. 15, 1997

[30] Foreign Application Priority Data

Mar. 23, 1996 [DE] Germany .......................... 29605411 U

[51] Int. Cl.⁶ ..................................................... A47F 5/00
[52] U.S. Cl. ........................ 248/309.1; 403/113; 403/84; 73/756; 16/267; 16/225
[58] Field of Search ........................... 248/309.1, 289.11, 248/292.14, 291.1, 288.11; 403/113, 112, 119, 381, 84, 87; 73/756, 431, 740, 741; 116/305; 16/267, 225

[56] References Cited

U.S. PATENT DOCUMENTS

| | | | |
|---|---|---|---|
| 892,993 | 7/1908 | Higgins | 16/267 |
| 1,249,081 | 12/1917 | Hastad | 403/112 X |
| 2,069,067 | 1/1937 | Hoffman | 248/291.1 X |
| 2,882,564 | 4/1959 | Couse et al. | 16/225 X |
| 2,892,220 | 6/1959 | Gillespie | 16/225 X |
| 2,990,571 | 7/1961 | Buchholtz | 16/267 |
| 4,413,529 | 11/1983 | Bissell | 73/756 |
| 5,448,799 | 9/1995 | Stein, Jr. | 16/225 |

*Primary Examiner*—Ramon O. Ramirez
*Assistant Examiner*—Long Dinh Phan
*Attorney, Agent, or Firm*—Dilworth & Barrese

[57] ABSTRACT

The invention relates to an assembly kit comprising a thermometer having a circular cylindrical groove attached at its rear side and which is open across an angle of less than 180°, and a holding device having a circular cylindrical member which can be pushed into the groove and is located on a web aligned, in terms of its longitudinal extension, off-center of the opening of the groove. Depending on requirements, the holding device can thereby be arranged in two different positions (180° offset), making it possible to twist the thermometer through 180° in total, i.e. through 90° in one direction and through 90° in the other direction.

14 Claims, 2 Drawing Sheets

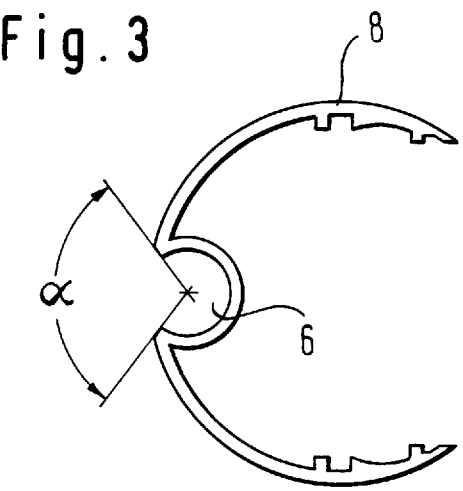
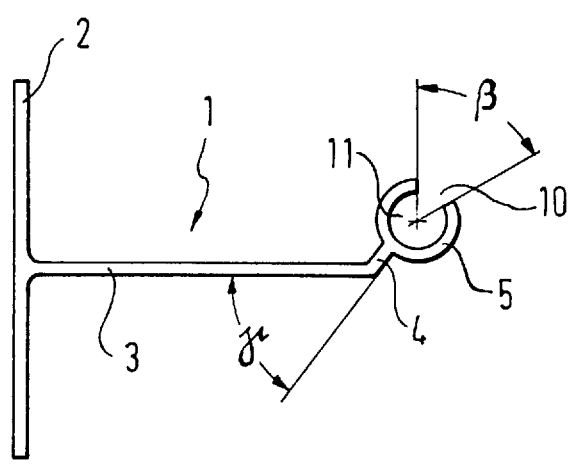

THERMOMETER MOUNT

BACKGROUND OF THE INVENTION

The invention relates to a thermometer mount, for example for securing a thermometer to a window or wall. So that the thermometer can be read more effectively by the user, it is frequently necessary to be able to turn the thermometer toward the user's eye. Hoops that are usually attached at the top and bottom and which are frequently connected together have so far been provided for this purpose.

SUMMARY OF THE INVENTION

The invention's object is to provide a thermometer mount which allows the thermometer to be read in an optimum manner while ensuring a simple design.

According to the invention, this object is solved by an assembly kit comprising a thermometer with a circular cylindrical groove attached at its rear side and which is open across an angle of less than 180°, and a holding device with a circular cylindrical member that can be pushed into the groove and which is located on a web aligned, in terms of its longitudinal extension, off-center of the opening of the groove and running at an angle to the perpendicular in relation to the wall to which the thermometer is to be attached.

The mount can be pushed with the circular cylindrical member into the groove that serves as a guide and where its height can be adjusted as required. The large width of the groove opening and the eccentric coordination of the web as a result of its corresponding arrangement on the cylindrical member produce an advantageously adjustable rotational possibility of 90° in relation to both sides, depending on whether the circular cylindrical member is attached in the one or other alignment to the wall or window. In this way, an advantageously utilizable 180° rotation is guaranteed. Preferably, a screw is screwed into the circular cylindrical member by interposing a deformable element so that the holding device can be secured within the groove by means of the deformable member.

The features of the claims enable the circular cylindrical member to be fixed simply within the guide groove. This fixing can, however, be performed such that twisting is nevertheless possible, whereas shaking is prevented.

BRIEF DESCRIPTION OF THE DRAWINGS

The invention shall be explained in further detail as follows by means of the drawings.

FIG. 3 shows a sectional view through a holding member at the thermometer side; and FIG. 4 shows a sectional view through a holding member at the window or wall side.

DESCRIPTION OF THE PREFERRED EMBODIMENTS

Figure 1:
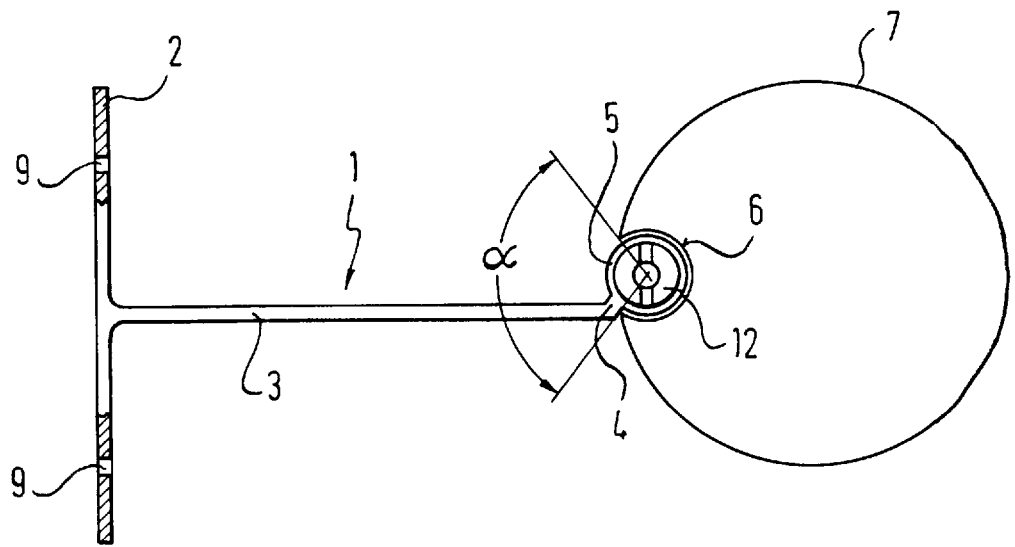
FIG. 1 shows a top plan view through the thermometer mount.

A thermometer mount according to FIG. 1 comprises an essentially T-shaped holding member 1 having a transverse web 2 and a longitudinal web 3. An intermediate portion 4 at the thermometer-side end of which a tubular circular cylindrical sliding member 5 is secured branches off from the thermometer-side end of longitudinal web 3 at an angle to the longitudinal extension. This sliding member 5 is pushed into a guide groove 6 which has a unilateral opening $\alpha$ that has at least one opening angle of less than 180°, though preferably of 106°. Guide groove 6 is located on the rear side of a thermometer 7, although the guide groove may also be located within a thermometer-side holding member 8 into which the thermometer can be inserted (see FIG. 3).

In the transverse web are located two securing holes 9 with which this transverse web 2 can be attached to a wall or window.

Wall-side holding member 1 is again depicted in FIG. 4. Web section 4 runs with respect to longitudinal web 3 at an angle $\chi$ of for example 53°. According to this representation, circular cylindrical member 5 is provided with a continuous longitudinal slot 10 which has an opening angle $\beta$ of for example 60°. As a result, circular cylindrical member 5 is variable in terms of its average dimension so as to bring about a clamping effect between this member and guide groove 6. Circular cylindrical member 5 can then be fixed within groove 6 for example by means of a straddling dowel.

Figure 2:
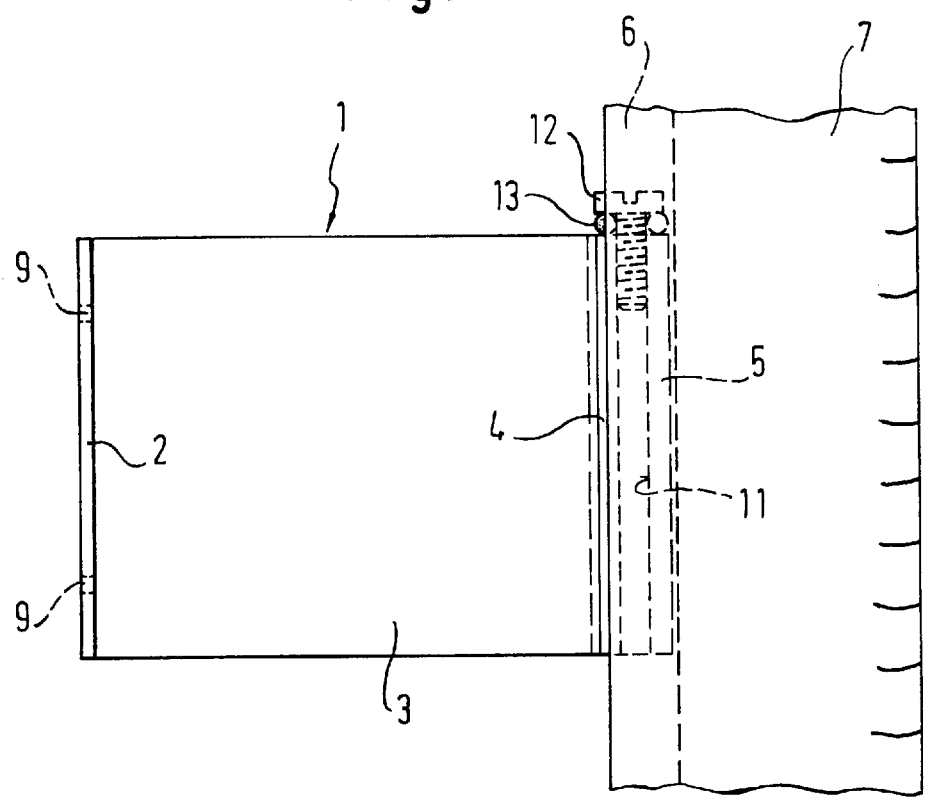
FIG. 2 shows a side view of the thermometer mount according to FIG. 1.

According to FIGS. 1 and 2, a screw 12 is screwed into bore 11 of circular cylindrical member 5 by interposing an O-ring 13 which is squeezed and can be deformed as a result of the screwing-in operation such that circular cylindrical member 5 can thereby be secured within guide groove 6.

In accordance with the representation in FIG. 1, intermediate web 4 projects into the groove at the lower edge of the opening of guide groove 6 in the drawing, with the result that it is possible to twist the thermometer anticlockwise through approx. 90°. If the intention is to enable clockwise twisting, wall-side mount 1 might be arranged to be offset through 180°, with the result that intermediate web 4 at the drawing's upper opening edge projects into the guide groove and hence a degree of freedom is possible for a 90° clockwise rotation. If desired, it is consequently possible to pivot through 180° in total.

I claim:

1. An assembly kit comprising
    a thermometer,
    a circular cylindrical groove formed on a rear side of said thermometer, said groove being open across an angle of less than 180°, and
    a holding device, comprising
        a circular cylindrical member adapted to be pushed into said groove,
        a web upon which said circular cylindrical member is mounted, said web extending in a longitudinal direction and aligned off-center from the opening of said groove and being mountable upon a wall to extend at an angle to a substantially perpendicular direction to the wall upon which said thermometer is adapted to be secured.

2. The assembly kit according to claim 1, additionally comprising
    a bore situated in said circular cylindrical member,
    a screw adapted to be screwed into said bore of said circular cylindrical member, and
    a deformable element adapted to be interposed between said screw and said circular cylindrical member, whereby said holding device is adapted to be secured within said groove by said deformable member.

3. The assembly kit according to claim 2, wherein said deformable element is an O-ring.

4. The assembly kit according to claim 1, additionally comprising a slot provided within said circular cylindrical member and disposed such that said circular cylindrical member can be expanded and hence secured within said groove.

5. The assembly kit according to claim 1, wherein said web comprises a portion arranged to extend in the perpendicular direction when the web is mounted on the wall, and an intermediate web portion on which said circular cylindrical member is located, said intermediate web portion shaped and arranged to extend at an angle to said web portion extending in the perpendicular direction to the wall to which said thermometer is adapted to be secured.

6. The assembly kit according to claim 5, wherein said web additionally comprises a transverse web portion positioned at an end of said web opposite said intermediate web portion and circular cylindrical member, said transverse web portion adapted to be secured to the wall, and said intermediate web portion extending at a non-perpendicular angle to a plane of said transverse web portion.

7. The assembly kit according to claim 5, wherein said web comprises a transverse web portion positioned at an end thereof opposite said circular cylindrical member and adapted to be secured to the wall, with said web running, at least in part, at a non-perpendicular angle to a plane of said transverse web portion.

8. An assembly kit for mounting a thermometer upon a wall or other supporting structure, comprising a first holding member adapted to receive the thermometer, a circular cylindrical groove formed at a rear side of said thermometer holding member and which is open across an angle of less than 180°, a second holding device, comprising
  a circular cylindrical member adapted to be pushed into said groove, and
  a web upon which said circular cylindrical member is located, said web extending in a longitudinal direction thereof and aligned off-center to the opening of said groove and being mountable upon the wall or supporting structure to extend at an angle to a substantially perpendicular direction to the wall or supporting structure upon which the thermometer is adapted to be secured.

9. The assembly kit according to claim 8, additionally comprising a bore situated in said circular cylindrical member, a screw adapted to be screwed into said bore of said circular cylindrical member, and a deformable element adapted to be interposed between said screw and said circular cylindrical member, whereby said second holding device is adapted to be secured within said groove by said deformable member.

10. The assembly kit according to claim 9, wherein said deformable element is an O-ring.

11. The assembly kit according to claim 8, additionally comprising a slot provided within said circular cylindrical member and disposed such that said circular cylindrical member can be expanded and hence secured within said groove.

12. The assembly kit according to claim 8, wherein said web comprises a portion arranged to extend in the perpendicular direction when the web is mounted upon the wall or supporting structure, an intermediate web portion on which said circular cylindrical member is located, said intermediate web portion shaped and arranged to extend at an angle to said web portion extending in the perpendicular direction to the wall or supporting structure to which the thermometer is adapted to be secured.

13. The assembly kit according to claim 12, wherein said web additionally comprises a transverse web portion positioned at an end of said web opposite said intermediate web portion and circular cylindrical member, said transverse web adapted to be secured to the wall or supporting structure, and said intermediate web portion extending at a non-perpendicular angle to a plane of said transverse web portion.

14. The assembly kit according to claim 8, wherein said web comprises a transverse web portion positioned at an end thereof opposite said circular cylindrical member and adapted to be secured to the wall or supporting structure, with said web running, at least in part, at a non-perpendicular angle to a plane of said transverse web portion.

* * * * *